(12) United States Patent
Nakao et al.

(10) Patent No.: US 11,833,543 B2
(45) Date of Patent: Dec. 5, 2023

(54) ULTRASONIC APPARATUS

(71) Applicant: Murata Manufacturing Co., Ltd., Nagaokakyo (JP)

(72) Inventors: Motoyasu Nakao, Nagaokakyo (JP); Kosuke Watanabe, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 1001 days.

(21) Appl. No.: 16/512,429

(22) Filed: Jul. 16, 2019

(65) Prior Publication Data
US 2019/0337016 A1 Nov. 7, 2019

Related U.S. Application Data

(63) Continuation of application No. PCT/JP2018/000271, filed on Jan. 10, 2018.

(30) Foreign Application Priority Data

Jan. 25, 2017 (JP) ................. 2017-011458

(51) Int. Cl.
*B06B 1/02* (2006.01)
*B06B 1/06* (2006.01)

(52) U.S. Cl.
CPC .......... *B06B 1/0215* (2013.01); *B06B 1/0692* (2013.01); *B06B 2201/40* (2013.01)

(58) Field of Classification Search
CPC .......... G01S 15/04; G01S 15/08; G01S 7/521; G01H 11/08; B06B 1/0215; B06B 2201/40; B06B 1/0692
See application file for complete search history.

(56) References Cited

U.S. PATENT DOCUMENTS 5,757,104 A * 5/1998 Getman ................. H03H 9/132
310/317
6,314,380 B1 * 11/2001 Seip ................. B60R 21/01536
280/735

(Continued)

FOREIGN PATENT DOCUMENTS

EP 2143381 A1 * 1/2010 ............... A61B 8/00
JP 61-270685 A 11/1986

(Continued)

OTHER PUBLICATIONS

Official Communication issued in International Patent Application No. PCT/JP2018/000271 dated Feb. 6, 2018.

*Primary Examiner* — Yuqing Xiao
*Assistant Examiner* — Christopher Richard Walker
(74) *Attorney, Agent, or Firm* — Keating & Bennett, LLP

(57) ABSTRACT

An ultrasonic apparatus includes a transmitting circuit, an ultrasonic transducer, a receiving circuit, and a capacitance measuring circuit. The ultrasonic transducer is a three-terminal ultrasonic transducer that includes a transmitting electrode, a receiving electrode, and a common electrode. The transmitting circuit outputs a driving signal to the transmitting electrode to cause the ultrasonic transducer to transmit ultrasonic waves. The receiving circuit receives a receive signal from the receiving electrode. The capacitance measuring circuit is electrically connected to the receiving electrode to measure the electrostatic capacitance of the ultrasonic transducer.

13 Claims, 9 Drawing Sheets

(56) References Cited

U.S. PATENT DOCUMENTS

| | | | |
|---|---|---|---|
| 8,854,056 B1 * | 10/2014 | Furuhira | B65H 7/02 |
| | | | 271/265.04 |
| 9,157,898 B1 * | 10/2015 | Steiner | G01S 15/04 |
| 2009/0054783 A1 | 2/2009 | Shibata | |
| 2013/0108061 A1 | 5/2013 | Ando et al. | |
| 2018/0021814 A1 | 1/2018 | Watanabe et al. | |

FOREIGN PATENT DOCUMENTS

| | | | | |
|---|---|---|---|---|
| JP | 10-54872 A | 2/1998 | | |
| JP | 11-150959 A | 6/1999 | | |
| JP | 3258111 B2 * | 2/2002 | | |
| JP | 2009-050334 A | 3/2009 | | |
| JP | 2012-049789 A | 3/2012 | | |
| JP | 2012-217012 A | 11/2012 | | |
| WO | WO-2016143133 A1 * | 9/2016 | | A61B 8/14 |
| WO | 2016/167003 A1 | 10/2016 | | |

* cited by examiner $$V_{MEAS} = \frac{\frac{1}{j\omega C_{SNS}}}{\frac{1}{j\omega C_{SNS}} + \frac{1}{j\omega C_{REF}}} \cdot V_{AC} = \frac{C_{REF}}{C_{SNS} + C_{REF}} \cdot V_{AC}$$

$$\therefore C_{SNS} = C_{REF} \cdot \left(\frac{V_{AC}}{V_{MEAS}} - 1\right)$$

ULTRASONIC APPARATUS

CROSS REFERENCE TO RELATED APPLICATIONS

This application claims the benefit of priority to Japanese Patent Application No. 2017-011458 filed on Jan. 25, 2017 and is a Continuation Application of PCT Application No. PCT/JP2018/000271 filed on Jan. 10, 2018. The entire contents of each application are hereby incorporated herein by reference.

BACKGROUND OF THE INVENTION

1. Field of the Invention

The present invention relates to an ultrasonic apparatus, and particularly, to a technique for measuring the electrostatic capacitance of a three-terminal ultrasonic transducer that includes a transmitting electrode and a receiving electrode independent of each other.

2. Description of the Related Art

Ultrasonic apparatuses are used in practice, in which an ultrasonic transducer transmits ultrasonic waves, receives reflected waves from an object to be detected, and thereby measures, for example, a distance to the object to be detected.

Since the speed of ultrasonic waves is affected by ambient temperature, temperature compensation is required to accurately measure the distance to the object to be detected.

Japanese Unexamined Patent Application Publication No. 61-270685 discloses an ultrasonic sensor that measures the electrostatic capacitance of an ultrasonic vibrator and performs temperature compensation using a relationship between the electrostatic capacitance of the ultrasonic vibrator and temperature.

The ultrasonic sensor (ultrasonic transducer) disclosed in Japanese Unexamined Patent Application Publication No. 61-270685 is a two-terminal ultrasonic transducer in which a transmitting vibrator (transmitting electrode) for transmitting ultrasonic waves and a receiving vibrator (receiving electrode) for receiving reflected waves are combined. Measuring the electrostatic capacitance of such a two-terminal ultrasonic transducer requires a switch to switch between a transmitting and receiving circuit and an electrostatic capacitance measuring circuit, so as to eliminate the influence of the capacitive component of the transmitting and receiving circuit.

Generally, for transmitting ultrasonic waves far away, some ultrasonic transducers employ a technique that boosts the voltage of a transmit signal. When, as in Japanese Unexamined Patent Application Publication No. 61-270685, a switch is used to switch between the transmitting and receiving circuit and the capacitance measuring circuit, the breakdown voltage specification of the switch is determined by the voltage of a transmitting circuit having a higher voltage. This increases the size of the switch to be used, and leads to increased component cost.

SUMMARY OF THE INVENTION

Preferred embodiments of the present invention provide ultrasonic apparatuses each capable of improving the measurement accuracy of the ultrasonic apparatus in measuring the electrostatic capacitance of the ultrasonic transducer, and at the same time reducing the cost of manufacturing the ultrasonic apparatus.

An ultrasonic apparatus according to a preferred embodiment of the present invention includes an ultrasonic transducer, a transmitting circuit, a receiving circuit, and a capacitance measuring circuit. The ultrasonic transducer is a three-terminal ultrasonic transducer that includes a common electrode, a transmitting electrode, and a receiving electrode independent of the transmitting electrode. The transmitting circuit outputs a driving signal to the transmitting electrode to cause the ultrasonic transducer to transmit ultrasonic waves. The receiving circuit receives a receive signal from the receiving electrode. The capacitance measuring circuit is electrically connected to the receiving electrode to measure the electrostatic capacitance of the ultrasonic transducer.

The ultrasonic apparatus preferably further includes a receive switch to connect the receiving electrode to either the receiving circuit or to the capacitance measuring circuit.

The ultrasonic apparatus preferably further includes a ground switch to ground the transmitting electrode when the capacitance measuring circuit measures the electrostatic capacitance.

The capacitance measuring circuit preferably includes an alternating-current signal generating circuit, a reference capacitor connected between the alternating-current signal generating circuit and the receiving electrode, an amplitude measuring circuit, and a capacitance calculating circuit. The alternating-current signal generating circuit generates an alternating-current signal of a reference amplitude having a frequency different from a resonant frequency of the ultrasonic transducer. The amplitude measuring circuit measures an amplitude between the reference capacitor and the receiving electrode. The capacitance calculating circuit calculates the electrostatic capacitance of the ultrasonic transducer based on the amplitude measured by the amplitude measuring circuit and the reference amplitude.

The capacitance measuring circuit preferably further includes a switching device to enable switching between a first state and a second state, the first state being a state where the alternating-current signal generating circuit and the amplitude measuring circuit are connected without interposition of the reference capacitor, the second state being a state where the alternating-current signal generating circuit and the amplitude measuring circuit are connected with the reference capacitor interposed therebetween. The capacitance calculating circuit measures the electrostatic capacitance of the ultrasonic transducer based on an amplitude measured in the first state by the amplitude measuring circuit and an amplitude measured in the second state by the amplitude measuring circuit.

The switching device preferably includes first to third switches. The first switch enables and disables conduction between the alternating-current signal generating circuit and the reference capacitor. The second switch enables and disables conduction between the receiving electrode and the amplitude measuring circuit. The third switch is connected at one end thereof to a first node between the alternating-current signal generating circuit and the first switch, and connected at the other end thereof to a second node between the amplitude measuring circuit and the second switch. The third switch enables and disables conduction between the first node and the second node. In the first state, the first switch and the second switch are brought out of conduction, and the third switch is brought into conduction. In the second state, the first switch and the second switch are brought into conduction, and the third switch is brought out of conduction.

The ultrasonic apparatus preferably further includes a temperature estimating circuit to estimate a temperature of the ultrasonic transducer based on a measured electrostatic capacitance of the ultrasonic transducer and a predetermined correlation between electrostatic capacitance and temperature.

The ultrasonic apparatuses according to preferred embodiments of the present invention each include a three-terminal ultrasonic transducer including a transmitting electrode and a receiving electrode independent of each other, and connects a circuit for electrostatic capacitance measurement to the receiving electrode to measure the electrostatic capacitance of the ultrasonic transducer. This reduces the influence of the impedance of the transmitting circuit on the measurement of the electrostatic capacitance of the ultrasonic transducer. By connecting a capacitance measuring circuit to the receiving electrode, the breakdown voltage of the circuit for electrostatic capacitance measurement is able to be reduced to less than that when connecting it to the transmitting side. It is thus possible to improve accuracy in measuring the electrostatic capacitance of the ultrasonic transducer, and at the same time reduce the cost of manufacture.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
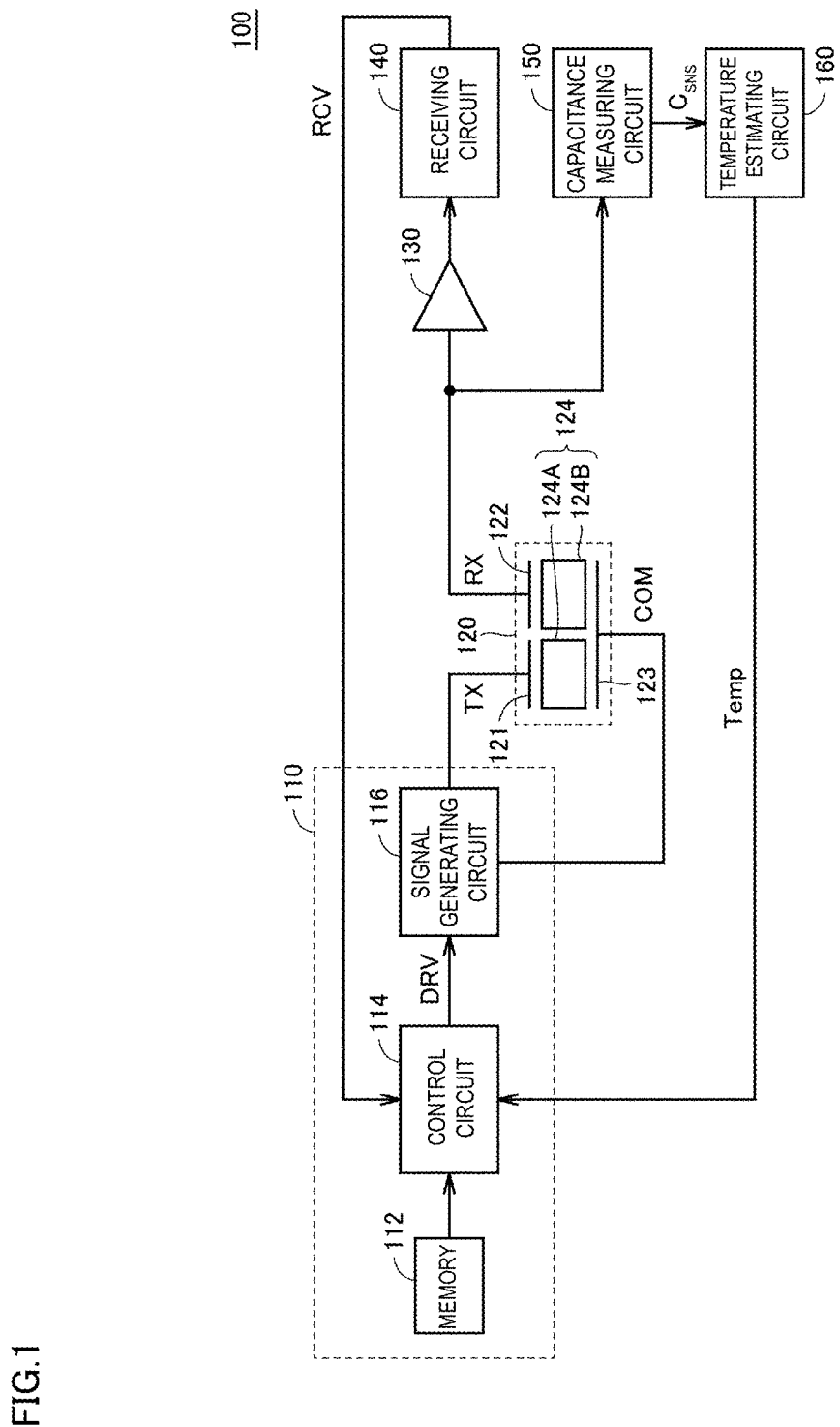
FIG. 1 is a block diagram illustrating a configuration of an ultrasonic apparatus according to a first preferred embodiment of the present invention.

Preferred embodiments of the present invention will be described in detail with reference to the drawings. The same or equivalent elements and portions throughout the drawings are denoted by the same reference numerals and their description will not be repeated.

First Preferred Embodiment

FIG. 1 is a block diagram illustrating a configuration of an ultrasonic apparatus 100 according to a first preferred embodiment of the present invention. Referring to FIG. 1, the ultrasonic apparatus 100 includes a transmitting circuit 110, an ultrasonic transducer 120, an amplifier 130, a receiving circuit 140, a capacitance measuring circuit 150, and a temperature estimating circuit 160.

The transmitting circuit 110 transmits ultrasonic waves from the ultrasonic transducer 120 by driving the ultrasonic transducer 120. The transmitting circuit 110 includes a memory 112, a control circuit 114, and a signal generating circuit 116. The control circuit 114 reads data stored in the memory 112 and outputs, to the signal generating circuit 116, a control signal DRV suitable to drive the ultrasonic transducer 120. Based on the control signal DRV output from the control circuit 114, the signal generating circuit 116 generates an alternating-current voltage (ultrasonic pulse: transmit signal) from a direct-current voltage. The signal generating circuit 116 amplifies the generated alternating-current voltage as appropriate, and supplies the amplified alternating-current voltage to the ultrasonic transducer 120. The configuration of the signal generating circuit 116 will be described in detail below.

The ultrasonic transducer 120 is a three-terminal ultrasonic transducer that includes a transmitting electrode 121 (terminal TX), a receiving electrode 122 (terminal RX), a common electrode 123 (terminal COM), and a piezoelectric body 124. The transmitting electrode 121 and the common electrode 123 are connected to the signal generating circuit 116 of the transmitting circuit 110. The receiving electrode 122 is connected to the capacitance measuring circuit 150, and is at the same time connected to the receiving circuit 140, with the amplifier 130 interposed therebetween.

The piezoelectric body 124 includes a transmitting region 124A to transmit ultrasonic waves, and a receiving region 124B to receive reflected ultrasonic waves. The transmitting electrode 121 is disposed opposite the common electrode 123, with the transmitting region 124A of the piezoelectric body 124 interposed therebetween, and is electrically connected to the transmitting region 124A. The receiving electrode 122 is disposed opposite the common electrode 123, with the receiving region 124B of the piezoelectric body 124 interposed therebetween, and is electrically connected to the receiving region 124B. The common electrode 123 is electrically connected to both of the transmitting region 124A and the receiving region 124B.

The transmitting electrode 121 receives a transmit signal from the signal generating circuit 116. In response to the transmit signal, the transmitting region 124A of the piezoelectric body 124 vibrates together with a housing of the ultrasonic transducer, and transmits ultrasonic waves, for example, into the air.

The ultrasonic waves transmitted from the transmitting electrode 121 are reflected by an object. The receiving electrode 122 receives the reflected waves from the object and vibrates. The receiving region 124B of the piezoelectric body 124 converts the vibration of the transmitting electrode 121 into an electric signal, and outputs the electric signal as a receive signal to the amplifier 130 and to the capacitance measuring circuit 150.

The amplifier 130 is, for example, an inverting amplifier circuit that includes a resistor and an operational amplifier (neither of which are shown). The amplifier 130 amplifies the receive signal from the transmitting electrode 121 and outputs it to the receiving circuit 140.

The receiving circuit 140 receives the receive signal amplified by the amplifier 130. The receiving circuit 140 detects the voltage value of the receive signal, and outputs a detected value RCV to the control circuit 114.

The capacitance measuring circuit 150 measures an electrostatic capacitance $C_{SNS}$ of the ultrasonic transducer 120 (as described below). The measured electrostatic capacitance $C_{SNS}$ is output to the temperature estimating circuit 160.

Figure 2:
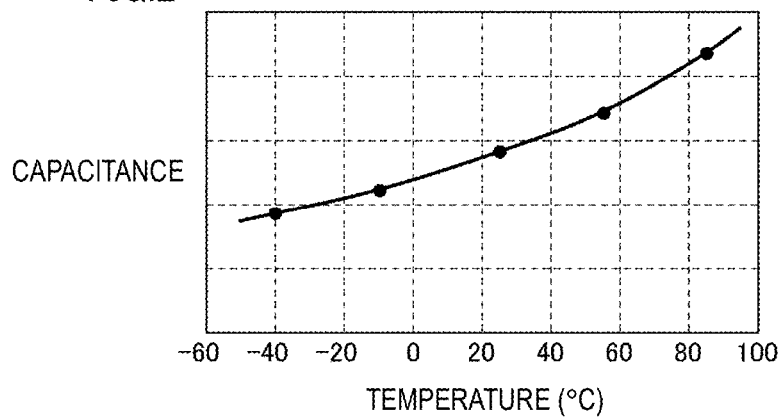
FIG. 2 is a graph showing a relationship between temperature and electrostatic capacitance of an ultrasonic transducer.

Based on the electrostatic capacitance $C_{SNS}$ measured by the capacitance measuring circuit 150, the temperature estimating circuit 160 estimates a temperature Temp of the ultrasonic transducer 120 from a relationship between temperature and electrostatic capacitance (such as that shown in FIG. 2) determined in advance, for example, by experiment. The estimated temperature Temp is output to the control circuit 114. Although the temperature estimating circuit 160 in FIG. 1 is illustrated as a circuit independent of the control circuit 114, the temperature estimating circuit 160 may be included in the control circuit 114.

Based on the detected value RCV from the receiving circuit 140, the control circuit 114 identifies information about the presence and movement of an object and the distance to the object. Based on the temperature Temp of the ultrasonic transducer 120 estimated by the temperature estimating circuit 160, the control circuit 114 performs temperature compensation control, such as correction of the detected distance or adjustment of the control signal DRV. The ultrasonic apparatus 100 is able to be used, for example, as an ultrasonic sensor mounted on a vehicle.

As described above, the temperature of the ultrasonic transducer 120 is estimated based on the electrostatic capacitance of the ultrasonic transducer 120. This eliminates the need for the addition of a temperature sensor to detect the temperature. On the other hand, whether the temperature compensation control is properly performed is dependent on the accuracy of the estimated temperature of the ultrasonic transducer 120. Therefore, it is necessary to accurately measure the electrostatic capacitance of the ultrasonic transducer 120.

Accordingly, in the present preferred embodiment, the three-terminal ultrasonic transducer 120 including the transmitting electrode 121 and the receiving electrode 122, which are separated, is provided, and the receiving electrode 122 is provided with the capacitance measuring circuit 150. This configuration is able to reduce the influence of the impedance of the transmitting circuit 110 on the measurement of the electrostatic capacitance $C_{SNS}$ of the ultrasonic transducer 120, and thus is able to improve accuracy in measuring the electrostatic capacitance of the ultrasonic transducer 120.

The capacitance measuring circuit 150 may be connected to the transmitting electrode 121 to reduce the influence of the impedance of the receiving-side circuit. However, in order to transmit a transmit signal as far away as possible, the transmitting circuit 110 may use a technique that boosts the voltage of the transmit signal. In this case, the breakdown voltage level of an element included in the capacitance measuring circuit 150 is required to be as high as the voltage level of the transmitting circuit 110. Therefore, to reduce circuit size and cost, it is more preferable that the capacitance measuring circuit 150 is connected to the receiving electrode 122.

Figure 3:
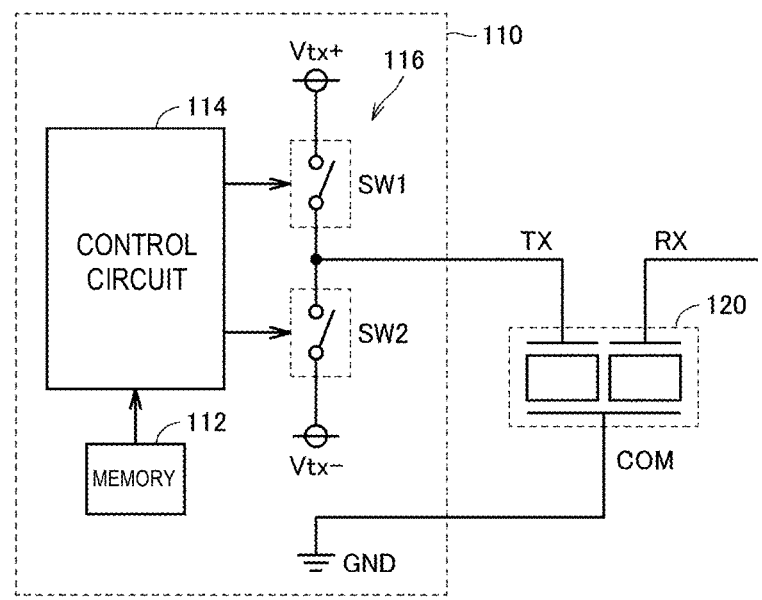
FIG. 3 is a diagram illustrating a first example of a transmitting circuit illustrated in FIG. 1.

FIG. 3 is a diagram for explaining details of the transmitting circuit 110 illustrated in FIG. 1. Referring to FIG. 3, the signal generating circuit 116 includes a positive power supply $V_{tx+}$, a negative power supply $V_{tx-}$, and switches SW1 and SW2. The switches SW1 and SW2 are connected in series between the positive power supply $V_{tx+}$ and the negative power supply $V_{tx-}$ to define a half-bridge circuit. A connection node between the switch SW1 and the switch SW2 is connected to the transmitting electrode 121 (TX) of the ultrasonic transducer 120. The switches SW1 and SW2 are controlled by the control signal DRV from the control circuit 114 and generate, from the direct-current positive power supply $V_{tx+}$ and negative power supply $V_{tx-}$, an alternating-current voltage (transmit signal) to drive the ultrasonic transducer 120. Specifically, by bringing the switch SW1 into conduction and bringing the switch SW2 out of conduction, a positive pulse is output to the ultrasonic transducer 120. Conversely, by bringing the switch SW1 out of conduction and bringing the switch SW2 into conduction, a negative pulse is output to the ultrasonic transducer 120.

The common electrode 123 (COM) of the ultrasonic transducer 120 is connected to a ground potential GND in the transmitting circuit 110.

Figure 4:
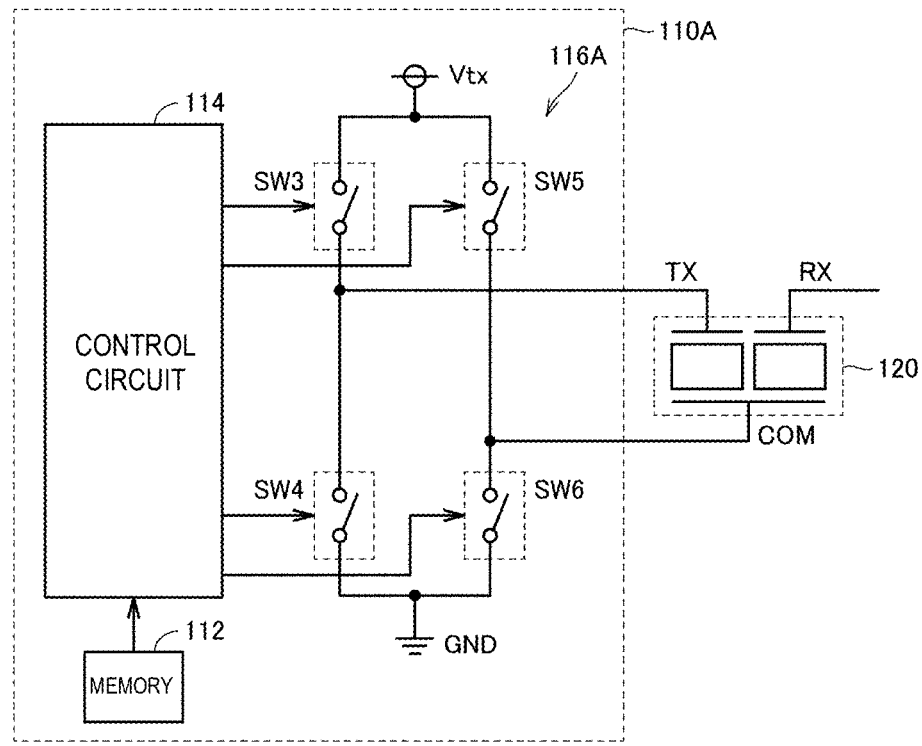
FIG. 4 is a diagram illustrating a second example of the transmitting circuit illustrated in FIG. 1.

FIG. 4 is a diagram illustrating another example of the transmitting circuit illustrated in FIG. 1. A transmitting circuit 110A illustrated in FIG. 4 differs from the transmitting circuit in FIG. 3 in that a signal generating circuit 116A defines a full-bridge circuit.

Referring to FIG. 4, the signal generating circuit 116A includes a direct-current power supply $V_{tx}$ and switches SW3 to SW6. The switches SW3 and SW4 are connected in series between the direct-current power supply $V_{tx}$ and the ground potential GND. The switches SW5 and SW6 are also connected in series between the direct-current power supply $V_{tx}$ and the ground potential GND. The switches SW3 to SW6 thus define a full-bridge circuit.

The transmitting electrode 121 (TX) of the ultrasonic transducer 120 is connected to a connection node between the switch SW3 and the switch SW4. The common electrode 123 (COM) of the ultrasonic transducer 120 is connected to a connection node between the switch SW5 and the switch SW6.

The switches SW3 to SW6 are controlled by the control signal DRV from the control circuit 114 and generate, from the direct-current power supply $V_{tx}$, an alternating-current voltage (transmit signal) to drive the ultrasonic transducer 120. Specifically, by bringing the switches SW3 and SW6 into conduction and bringing the switches SW4 and SW5 out of conduction, a positive pulse is output to the ultrasonic transducer 120. Conversely, by bringing the switches SW3 and SW6 out of conduction and bringing the switches SW4 and SW5 into conduction, a negative pulse is output to the ultrasonic transducer 120.

Next, with reference to FIG. 5 and FIG. 6, the capacitance measuring circuit 150 of FIG. 1 and a capacitance measuring technique will be described in detail.

Figure 5:
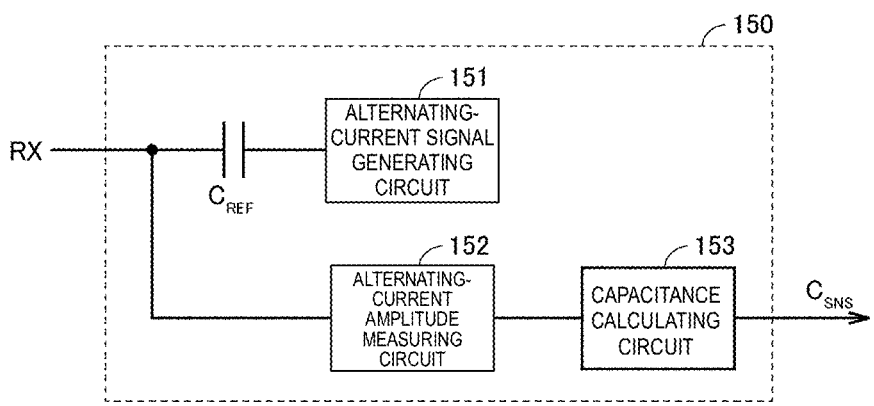
FIG. 5 is a diagram illustrating details of a capacitance measuring circuit illustrated in FIG. 1.

Referring to FIG. 5, the capacitance measuring circuit 150 includes a reference capacitor $C_{REF}$ having a given capacitance, an alternating-current signal generating circuit 151, an alternating-current amplitude measuring circuit 152, and a capacitance calculating circuit 153.

The alternating-current signal generating circuit 151 is connected to the receiving electrode 122, with the reference capacitor $C_{REF}$ interposed therebetween. The alternating-current signal generating circuit 151 outputs an alternating-current voltage signal having a predetermined amplitude $V_{AC}$.

The alternating-current amplitude measuring circuit 152 is connected to the receiving electrode 122 and measures the voltage amplitude of an alternating-current signal at the receiving electrode 122. A voltage amplitude $V_{MEAS}$ measured is output to the capacitance calculating circuit 153.

The capacitance calculating circuit 153 calculates the electrostatic capacitance $C_{SNS}$ of the ultrasonic transducer 120 from the reference capacitance $C_{REF}$ and the amplitude $V_{AC}$ stored in a storage (not shown) and the voltage amplitude $V_{MEAS}$ measured by the alternating-current amplitude measuring circuit 152. The calculated electrostatic capacitance $C_{SNS}$ is output to the temperature estimating circuit 160.

Figure 6:
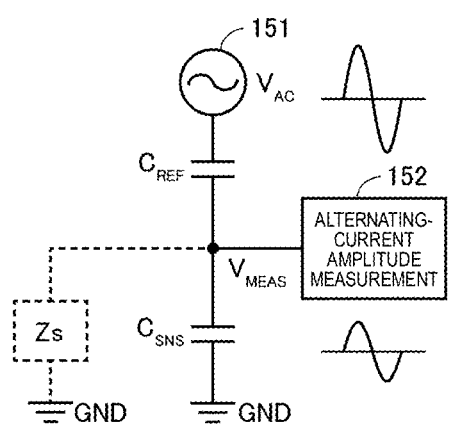
FIG. 6 is a diagram for explaining how the electrostatic capacitance of the ultrasonic transducer is calculated in a capacitance calculating circuit.

FIG. 6 is a diagram for explaining details of how the electrostatic capacitance $C_{SNS}$ of the ultrasonic transducer 120 is calculated in the capacitance calculating circuit 153. As illustrated in FIG. 6, when the electrostatic capacitance $C_{SNS}$ of the ultrasonic transducer 120 is measured, the reference capacitance $C_{REF}$ and the electrostatic capacitance $C_{SNS}$ of the ultrasonic transducer 120 define a circuit connected in series between the alternating-current power supply (alternating-current signal generating circuit 151) and the ground potential GND. The voltage amplitude $V_{MEAS}$ measured by the alternating-current amplitude measuring circuit 152 and the alternating-current voltage amplitude $V_{AC}$ output from the alternating-current signal generating circuit 151 thus satisfy the relationship represented by the following equation (1).

$$V_{MEAS} = \frac{\frac{1}{j\omega C_{SNS}}}{\frac{1}{j\omega C_{SNS}} + \frac{1}{j\omega C_{REF}}} \cdot V_{AC} = \frac{C_{REF}}{C_{SNS} + C_{REF}} \cdot V_{AC} \quad (1)$$

By modifying the equation (1), the electrostatic capacitance $C_{SNS}$ of the ultrasonic transducer 120 is able to be calculated by the following equation (2) using the reference capacitance $C_{REF}$, the alternating-current voltage amplitude $V_{AC}$, and the voltage amplitude $V_{MEAS}$ measured.

$$C_{SNS} = C_{REF} \cdot \left(\frac{V_{AC}}{V_{MEAS}} - 1\right) \quad (2)$$

When the electrostatic capacitance $C_{SNS}$ of the ultrasonic transducer 120 is measured in the capacitance measuring circuit 150 as described above, in an equivalent circuit, as indicated by a broken line in FIG. 6, an impedance Zs of a resonant circuit of the ultrasonic transducer 120 may be expressed as being connected in parallel to the electrostatic capacitance $C_{SNS}$ to be measured. When the impedance Zs is high, the impedance Zs has little influence on the voltage amplitude $V_{MEAS}$ measured in the alternating-current amplitude measuring circuit 152. When the impedance Zs is low, however, its influence on the voltage amplitude $V_{MEAS}$ cannot be ignored, and accuracy in measuring the calculated electrostatic capacitance $C_{SNS}$ may be degraded. The impedance Zs of the resonant circuit of the ultrasonic transducer 120 is lowered when the frequency of an applied signal becomes close to the resonant frequency of the resonant circuit. To prevent degradation of accuracy in measuring the electrostatic capacitance $C_{SNS}$, it is preferable that the frequency of the alternating-current voltage signal output from the alternating-current signal generating circuit 151 are different from the resonant frequency of the ultrasonic transducer 120, and is set such that the impedance Zs of the resonant circuit of the ultrasonic transducer 120 is high. For example, when the resonant frequency of the ultrasonic transducer 120 is about 50 kHz, the frequency of the alternating-current voltage signal output from the alternating-current signal generating circuit 151 is preferably designed to be about 10 kHz.

When the impedance of the amplifier 130 is designed to be sufficiently larger than the impedance of the electrostatic capacitance $C_{SNS}$, there is no need to provide an element to switch in the measurement of the electrostatic capacitance $C_{SNS}$ of the ultrasonic transducer 120, and this reduces the component cost.

As described above, when a three-terminal ultrasonic transducer is provided and the capacitance measuring circuit is connected to the receiving electrode to measure the electrostatic capacitance $C_{SNS}$ of the ultrasonic transducer, it is possible to reduce the influence of the impedance of the transmitting circuit and improve accuracy in measuring the electrostatic capacitance $C_{SNS}$. This improves accuracy in estimating the temperature of the ultrasonic transducer, and enables proper temperature compensation.

In the ultrasonic apparatus 100 illustrated in FIG. 1, when the impedance of the amplifier 130 is designed to be sufficiently larger than the impedance of the electrostatic capacitance $C_{SNS}$, even when the amplifier 130 and the capacitance measuring circuit 150 are in an electrically connected state during measurement of the electrostatic capacitance $C_{SNS}$ of the ultrasonic transducer 120 performed in the capacitance measuring circuit 150, the amplifier 130 has little influence on the electrostatic capacitance $C_{SNS}$. However, if the impedance of the amplifier 130 cannot be made sufficiently high, accuracy in measuring the electrostatic capacitance $C_{SNS}$ of the ultrasonic transducer 120 may be degraded by the influence of the impedance of the amplifier 130.

Accordingly, an ultrasonic apparatus 100A according to a first modification of the first preferred embodiment includes a configuration obtained by adding a receive switch SW10 to the ultrasonic apparatus 100 illustrated in FIG. 1. The receive switch SW10 connects the amplifier 130 and the receiving circuit 140 to the receiving electrode 122, or connect the capacitance measuring circuit 150 to the receiving electrode 122. Of the elements illustrated in FIG. 7, the same elements as those illustrated in FIG. 1 will not be described again here.

Figure 7:
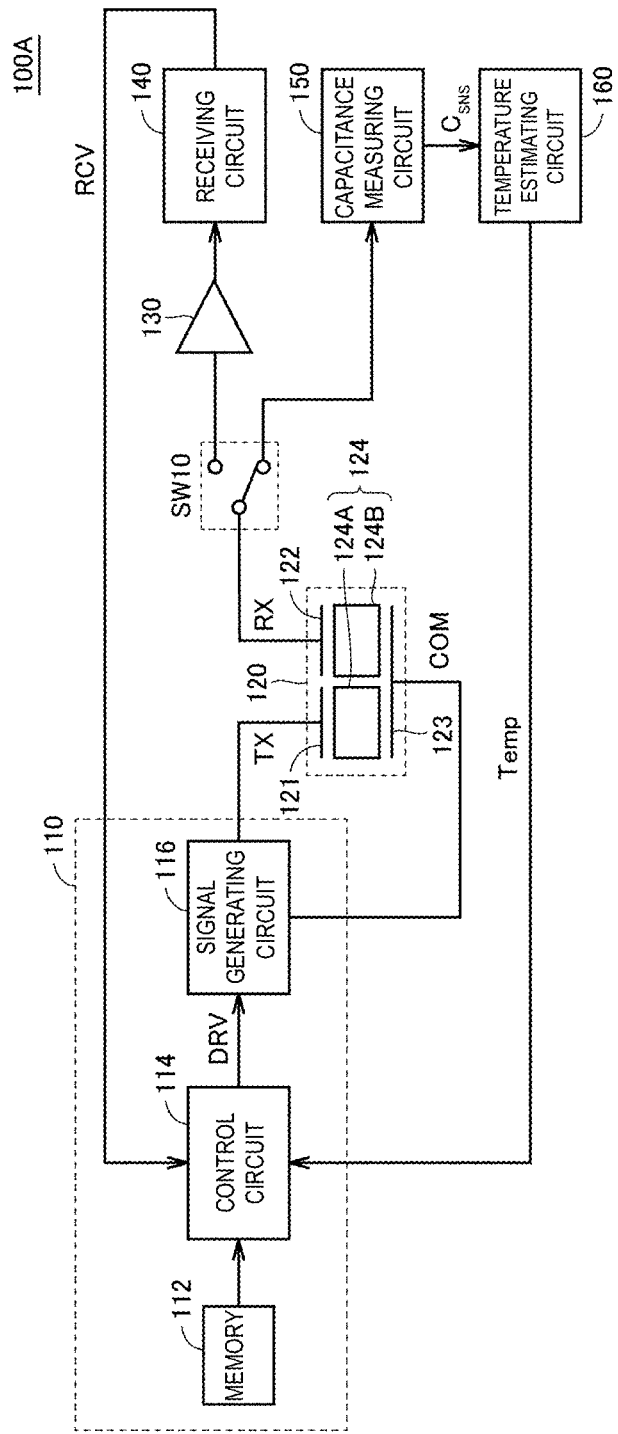
FIG. 7 is a diagram illustrating a modification of the ultrasonic apparatus according to the first preferred embodiment of the present invention.

FIG. 7 is a diagram illustrating a modification of the ultrasonic apparatus according to the first preferred embodiment. Referring to FIG. 7, the receive switch SW10 includes an input terminal and first and second output terminals. The receiving electrode 122 is connected to the input terminal and the amplifier 130 is connected to the first output terminal. The capacitance measuring circuit 150 is connected to the second output terminal.

For detecting the presence of, or distance to, an object based on reflected waves received by the receiving electrode 122, the receive switch SW10 connects the input terminal to the first output terminal. On the other hand, for measuring the electrostatic capacitance $C_{SNS}$ of the ultrasonic transducer 120, the receive switch SW10 connects the input terminal to the second output terminal. Thus, during measurement of the electrostatic capacitance $C_{SNS}$ of the ultrasonic transducer 120, the amplifier 130 and the receiving circuit 140 are electrically isolated from the capacitance measuring circuit 150. This eliminates the influence of the impedance of the amplifier 130, and further improves accuracy in measuring the electrostatic capacitance $C_{SNS}$ of the ultrasonic transducer 120.

Since the receive switch SW10 is connected to the receiving electrode 122, the breakdown voltage of the receive switch SW10 is able to be reduced to less than that of the switch used to switch the measurement of capacitance, described in Japanese Unexamined Patent Application Publication No. 61-270685. This makes it possible to reduce the component cost.

A modification of the capacitance measuring circuit in the ultrasonic apparatus 100 according to the first preferred embodiment will now be described with reference to FIG. 8 and FIG. 9.

As illustrated in FIG. 6, a calculation in the capacitance measuring circuit 150 is made with respect to the voltage amplitude $V_{AC}$ of an alternating-current signal generated in the alternating-current signal generating circuit 151. Therefore, accuracy in measuring the electrostatic capacitance $C_{SNS}$ of the ultrasonic transducer 120 depends on the accuracy of the voltage amplitude $V_{AC}$ of the alternating-current signal generated in the alternating-current signal generating circuit 151. On the other hand, the voltage amplitude $V_{AC}$ of the alternating-current signal may change in accordance with the temperature characteristic, or variations in the characteristics, of the alternating-current signal generating circuit 151, and such change may affect accuracy in measuring the electrostatic capacitance $C_{SNS}$.

Accordingly, to measure the electrostatic capacitance $C_{SNS}$ of the ultrasonic transducer 120, a capacitance measuring circuit 150A of the present modification first measures and calibrates the voltage amplitude $V_{AC}$ of an alternating-current signal generated by the alternating-current signal generating circuit 151, and then measures the electrostatic capacitance $C_{SNS}$ using the technique illustrated in FIG. 6. Such calibration is able to reduce or eliminate the influence of change in the characteristic of the voltage amplitude $V_{AC}$ of the alternating-current signal, and thus is able to further improve accuracy in measuring the electrostatic capacitance $C_{SNS}$ of the ultrasonic transducer 120.

Figure 8:
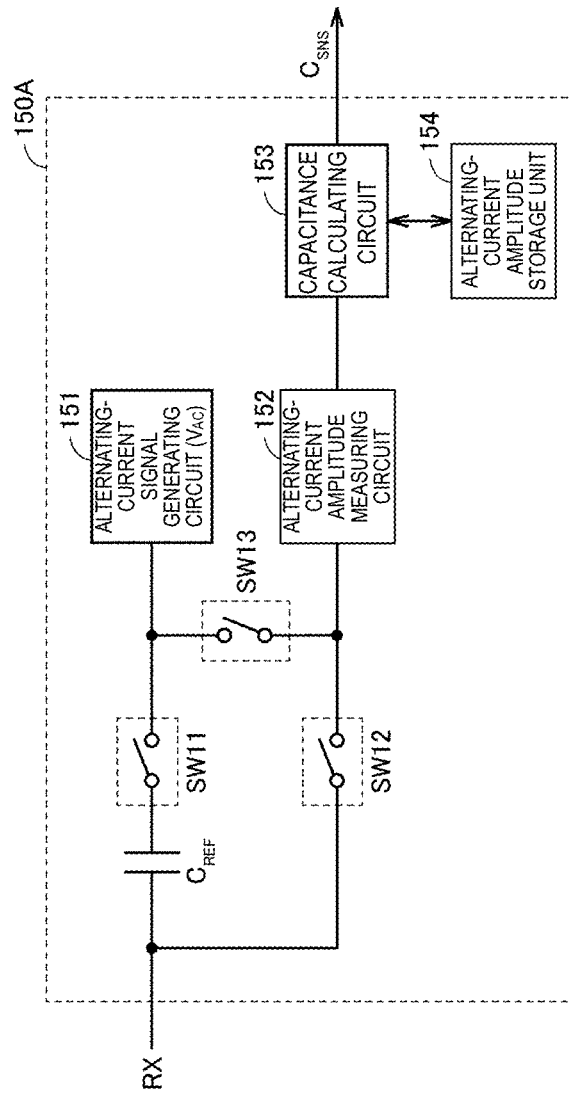
FIG. 8 is a diagram illustrating a modification of a capacitance measuring circuit according to a preferred embodiment of the present invention.

FIG. 8 is a block diagram of the capacitance measuring circuit 150A according to the present modification. The configuration illustrated in FIG. 8 is obtained by adding a switching device, defined by switches SW11 to SW13, and an alternating-current amplitude storage 154, to the capacitance measuring circuit 150 of the first preferred embodiment illustrated in FIG. 5. Of the elements illustrated in FIG. 8, the same or similar elements as those illustrated in FIG. 5 will not be described again here.

Referring to FIG. 8, the switch SW11, which is a first switch, is connected between the reference capacitor $C_{REF}$ and the alternating-current signal generating circuit 151, and enables and disables conduction between the reference capacitor $C_{REF}$ and the alternating-current signal generating circuit 151. The switch SW12, which is a second switch, is connected between the receiving electrode 122 (RX) and the alternating-current amplitude measuring circuit 152, and enables and disables conduction between the receiving electrode 122 (RX) and the alternating-current amplitude measuring circuit 152.

The switch SW13, which is a third switch, is connected at one end thereof to a connection node (first node) between the switch SW11 and the alternating-current signal generating circuit 151. The switch SW13 is connected at the other end thereof to a connection node (second node) between the switch SW12 and the alternating-current amplitude measuring circuit 152. The switch SW13 enables and disables conduction between the first node and the second node. The switches SW11 to SW13 are controlled, for example, by the control circuit 114 of the transmitting circuit 110.

For measurement of the electrostatic capacitance $C_{SNS}$ of the ultrasonic transducer 120, the switches SW11 and SW12 are first brought out of conduction and the switch SW13 is brought into conduction (first state). In the first state, the alternating-current amplitude measuring circuit 152 measures a voltage amplitude, and thus the reference amplitude voltage $V_{AC}$ of an alternating-current signal output from the alternating-current signal generating circuit 151 is measured. That is, the alternating-current amplitude measuring circuit 152 measures the voltage amplitude of the alternating-current signal from the alternating-current signal generating circuit 151, through a path not having the reference capacitor $C_{REF}$ therein. The alternating-current amplitude measuring circuit 152 stores the detected value of the measured voltage amplitude $V_{AC}$ in the alternating-current amplitude storage unit 154.

Then, the switches SW11 and SW12 are brought into conduction and the switch SW13 is brought out of conduction (second state). Thus, the alternating-current amplitude measuring circuit 152 measures the voltage amplitude of the alternating-current signal transmitted thereto from the alternating-current signal generating circuit 151 through the reference capacitor $C_{REF}$. In this state, which is the same as that of the circuit illustrated in FIG. 5, the alternating-current amplitude measuring circuit 152 measures the voltage amplitude $V_{MEAS}$ determined by the reference capacitance $C_{REF}$ and the electrostatic capacitance $C_{SNS}$ of the ultrasonic transducer 120.

The capacitance calculating circuit 153 calculates the electrostatic capacitance $C_{SNS}$ of the ultrasonic transducer 120 from the equation (2) based on the reference amplitude voltage $V_{AC}$ measured in the first state and stored in the alternating-current amplitude storage 154, the voltage amplitude $V_{MEAS}$ measured in the second state, and the reference capacitance $C_{REF}$.

Figure 9:
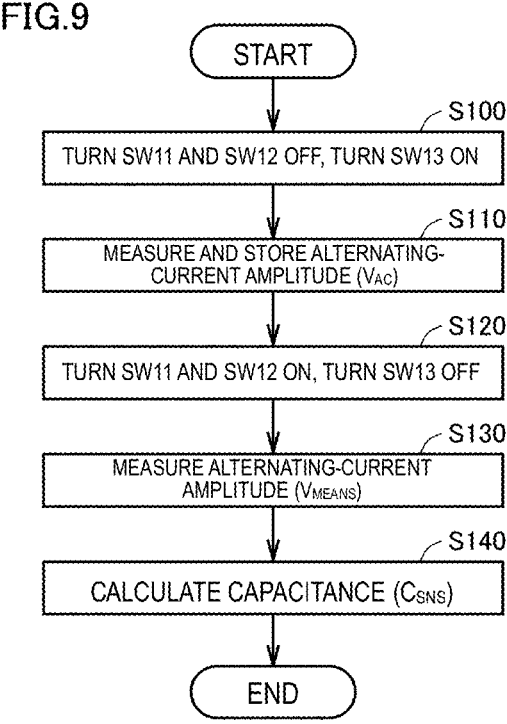
FIG. 9 is a flowchart of an electrostatic capacitance calculating process performed in the modification illustrated in FIG. 8.

FIG. 9 is a flowchart for explaining details of the process for calculating the electrostatic capacitance $C_{SNS}$ of the ultrasonic transducer 120 described with reference to FIG. 8. In the present modification described herein, the process of the flowchart of FIG. 9 is performed by the control circuit 114, and each circuit operates in accordance with a control signal from the control circuit 114. Each circuit may operate autonomously, or may be operated by a different control device (not shown).

Referring to FIG. 9, when the timing for measuring the electrostatic capacitance $C_{SNS}$ of the ultrasonic transducer 120 is reached, the control circuit 114 brings the switches SW11 and SW12 in the capacitance measuring circuit 150A out of conduction (i.e., turns SW11 and SW12 OFF) and brings the switch SW13 into conduction (i.e., turns SW13 ON), so that the first state is entered in step 100 (hereinafter, "step" will be abbreviated as "S"). Then, in S110, in this state, the control circuit 114 causes the alternating-current signal generating circuit 151 to output an alternating-current signal and causes the alternating-current amplitude measuring circuit 152 to measure the amplitude voltage at this point. The control circuit 114 stores the measured amplitude voltage in the alternating-current amplitude storage unit 154 as the reference amplitude voltage $V_{AC}$.

Then, in S120, the control circuit 114 brings the switches SW11 and SW12 into conduction (i.e., turns SW11 and SW12 ON) and brings the switch SW13 out of conduction (i.e., turns SW13 OFF), so that the second state is entered.

Then in S130, the control circuit 114 causes the alternating-current signal generating circuit 151 to output an alternating-current signal and causes the alternating-current amplitude measuring circuit 152 to measure the voltage amplitude $V_{MEAS}$ in the second state.

In S140, the control circuit 114 causes the capacitance calculating circuit 153 to calculate the electrostatic capacitance $C_{SNS}$ based on the voltage amplitude $V_{MEAS}$ measured in S130, the reference amplitude voltage $V_{AC}$ stored in S110, and the reference capacitance $C_{REF}$.

By performing control in accordance with the process described above, it is possible to reduce or eliminate the influence of change in the characteristic of the voltage amplitude $V_{AC}$ of the alternating-current signal generated by the alternating-current signal generating circuit 151. Accuracy in measuring the electrostatic capacitance $C_{SNS}$ of the ultrasonic transducer 120 is thus able to be further improved.

The configuration of the present modification may be combined with the configuration of the first modification.

Second Preferred Embodiment

When a three-terminal ultrasonic transducer is provided as in the first preferred embodiment, the influence of the impedance of the transmitting circuit 110 is able to be reduced to a certain extent. However, when the impedance of the transmitting circuit 110 varies, the measured electrostatic capacitance value may also vary.

A second preferred embodiment of the present invention provides a configuration in which, when the electrostatic capacitance of the ultrasonic transducer is measured in the capacitance measuring circuit 150 on the receiving side, the transmitting electrode 121 is grounded so as to fix the impedance of the transmitting circuit 110 and stabilize the measurement of electrostatic capacitance.

Figure 10:
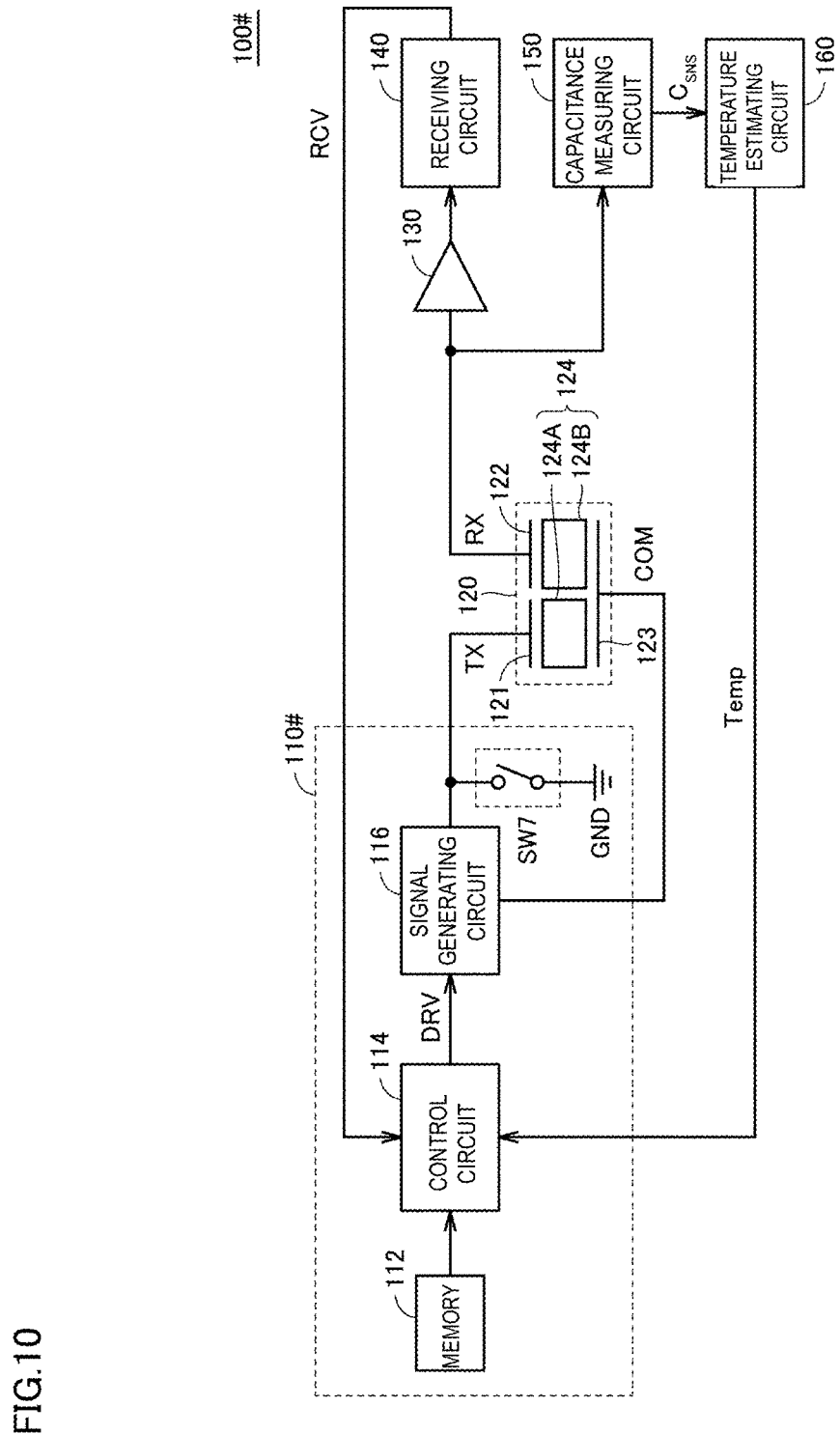
FIG. 10 is a block diagram illustrating a configuration of an ultrasonic apparatus according to a second preferred embodiment of the present invention.

FIG. 10 is an overall block diagram of an ultrasonic apparatus 100 #according to the second preferred embodiment. In FIG. 10, a transmitting circuit 110 #replaces the transmitting circuit 110 of the first preferred embodiment illustrated in FIG. 1. The transmitting circuit 110 #includes a ground switch SW7, as well as the components of the transmitting circuit 110 illustrated in FIG. 1. The switch SW7 is capable of enabling and disabling conduction between the transmitting electrode 121 and the ground potential GND. When the capacitance measuring circuit 150 measures the electrostatic capacitance of the ultrasonic transducer, the switch SW7 is brought into conduction to connect the transmitting electrode 121 to the ground potential GND.

Figure 11:
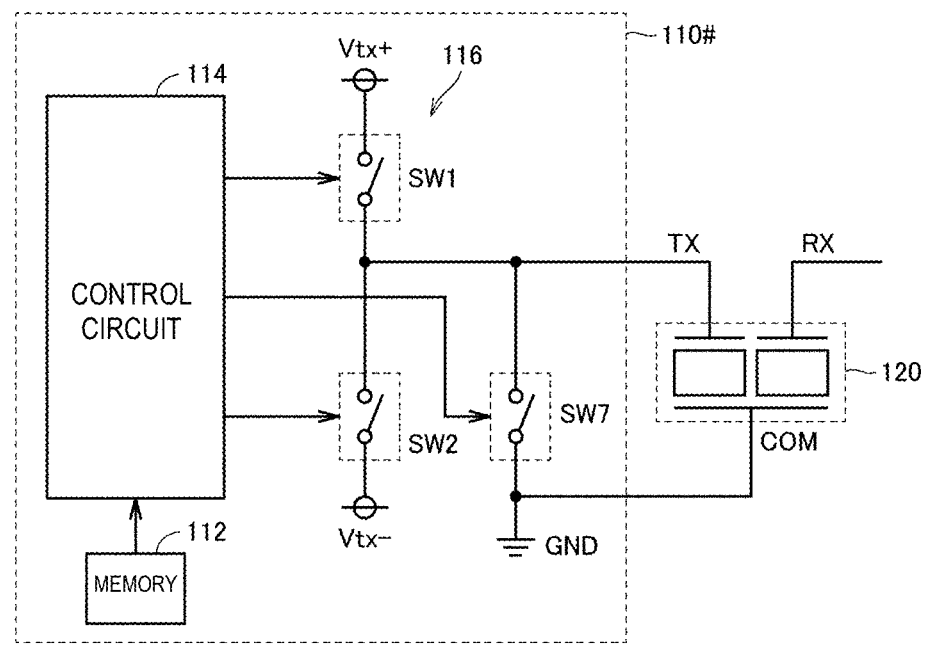
FIG. 11 is a diagram illustrating a transmitting circuit illustrated in FIG. 10.

FIG. 11 is a diagram corresponding to FIG. 3 of the first preferred embodiment. FIG. 11 illustrates the transmitting circuit 110 #in which the signal generating circuit 116 is defined by a half-bridge circuit. In the transmitting circuit 110 #, the switch SW7 is electrically connected at one end thereof to a connection node between the switch SW1 and the switch SW2 (i.e., to the transmitting electrode 121), and connected at the other end thereof to the ground potential GND. The switch SW7 is driven by the control circuit 114 and brought into conduction when the electrostatic capacitance of the ultrasonic transducer is measured in the capacitance measuring circuit 150.

The impedance between TX and COM is thus short-circuited and fixed. This makes it possible to reduce or eliminate the influence of variation in the impedance of the transmitting circuit on the measured capacitance value.

While not shown, if the signal generating circuit 116 is defined by a full-bridge circuit, the influence of the impedance of the circuit on the transmitting side is able to be reduced or eliminated in the same or similar manner as in FIG. 11, without requiring the switch SW7. More specifically, since TX and COM are able to be short-circuited by bringing the switch SW4 into conduction in FIG. 4, there is no need to add the switch SW7.

As described above, a three-terminal ultrasonic transducer is provided, a capacitance measuring circuit is connected to the receiving electrode of the ultrasonic transducer to measure the electrostatic capacitance of the ultrasonic transducer, and the transmitting electrode is grounded when the electrostatic capacitance is measured. Thus, the influence of the impedance of the transmitting circuit is able to be reduced or eliminated. This further improves accuracy in measuring the electrostatic capacitance, and enables proper temperature compensation of the ultrasonic transducer.

The second preferred embodiment is also applicable to the modifications of the first preferred embodiment.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An ultrasonic apparatus comprising:
a three-terminal ultrasonic transducer including a common electrode, a transmitting electrode, and a receiving electrode independent of the transmitting electrode;
a transmitting circuit to output a driving signal to the transmitting electrode to cause the ultrasonic transducer to transmit ultrasonic waves;
a receiving circuit to receive a receive signal from the receiving electrode; and
a capacitance measuring circuit that measures an electrostatic capacitance of the ultrasonic transducer while being electrically connected to the receiving electrode; wherein
the transmitting electrode is separated from the receiving electrode; and
the capacitance measuring circuit includes:
an alternating-current signal generating circuit to generate an alternating-current signal of a reference amplitude having a frequency different from a resonant frequency of the ultrasonic transducer;
a reference capacitor connected between the alternating-current signal generating circuit and the receiving electrode;
an amplitude measuring circuit to measure an amplitude between the reference capacitor and the receiving electrode; and
a capacitance calculating circuit to calculate the electrostatic capacitance of the ultrasonic transducer based on the amplitude measured by the amplitude measuring circuit and the reference amplitude.

2. The ultrasonic apparatus according to claim 1, further comprising a receive switch to connect the receiving electrode to either the receiving circuit or to the capacitance measuring circuit.

3. The ultrasonic apparatus according to claim 1, further comprising a ground switch to ground the transmitting electrode when the capacitance measuring circuit measures the electrostatic capacitance.

4. The ultrasonic apparatus according to claim 1, wherein the capacitance measuring circuit further includes a switching device to enable switching between a first state and a second state, the first state being a state where the alternating-current signal generating circuit and the amplitude measuring circuit are connected without interposition of the reference capacitor, the second state being a state where the alternating-current signal generating circuit and the amplitude measuring circuit are connected with the reference capacitor interposed therebetween; and the capacitance calculating circuit measures the electrostatic capacitance of the ultrasonic transducer based on an amplitude measured in the first state by the amplitude measuring circuit and an amplitude measured in the second state by the amplitude measuring circuit.

5. The ultrasonic apparatus according to claim 4, wherein the switching device includes:
- a first switch to enable and disable conduction between the alternating-current signal generating circuit and the reference capacitor;
- a second switch to enable and disable conduction between the receiving electrode and the amplitude measuring circuit; and
- a third switch connected at one end thereof to a first node between the alternating-current signal generating circuit and the first switch and connected at the other end thereof to a second node between the amplitude measuring circuit and the second switch, the third switch enabling and disabling conduction between the first node and the second node;
- in the first state, the first switch and the second switch are brought out of conduction, and the third switch is brought into conduction; and
- in the second state, the first switch and the second switch are brought into conduction, and the third switch is brought out of conduction.

6. The ultrasonic apparatus according to claim 1, further comprising a temperature estimating circuit to estimate a temperature of the ultrasonic transducer based on a calculated electrostatic capacitance of the ultrasonic transducer and a predetermined correlation between electrostatic capacitance and temperature.

7. The ultrasonic apparatus according to claim 1, wherein the ultrasonic transducer includes a piezoelectric body.

8. The ultrasonic apparatus according to claim 7, wherein the piezoelectric body includes a transmitting region to transmit ultrasonic waves, and a receiving region to receive reflected ultrasonic waves.

9. The ultrasonic apparatus according to claim 8, wherein the transmitting electrode is disposed opposite the common electrode, with the transmitting region interposed therebetween, and is electrically connected to the transmitting region.

10. The ultrasonic apparatus according to claim 8, wherein the receiving electrode is disposed opposite the common electrode, with the receiving region interposed therebetween, and is electrically connected to the receiving region.

11. The ultrasonic apparatus according to claim 8, wherein the common electrode is electrically connected to both of the transmitting region and the receiving region.

12. The ultrasonic apparatus according to claim 1, further comprising:
- an amplifier; wherein
- the receiving electrode is connected to the receiving circuit, with the amplifier interposed therebetween.

13. The ultrasonic apparatus according to claim 12, wherein the amplifier includes an inverting amplifier circuit including a resistor and an operational amplifier.

* * * * *